(12) United States Patent
Briggs, Jr. et al.

(10) Patent No.: US 11,519,356 B2
(45) Date of Patent: Dec. 6, 2022

(54) TECHNIQUES FOR ENGINE COOLING USING SUPERCRITICAL FLUIDS AND A COMBUSTION ENGINE SYSTEM IMPLEMENTING THE SAME

(71) Applicant: SOUTHWEST RESEARCH INSTITUTE, San Antonio, TX (US)

(72) Inventors: Thomas E. Briggs, Jr., Helotes, TX (US); Charles E. Roberts, Jr., Helotes, TX (US); Kevin L. Hoag, San Antonio, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 0 days.

(21) Appl. No.: 17/451,888

(22) Filed: Oct. 22, 2021

(65) Prior Publication Data

US 2022/0128016 A1  Apr. 28, 2022

Related U.S. Application Data

(60) Provisional application No. 63/198,487, filed on Oct. 22, 2020.

(51) Int. Cl.
| | |
|---|---|
| *F02F 1/26* | (2006.01) |
| *F01N 5/02* | (2006.01) |
| *F01P 9/00* | (2006.01) |
| *B33Y 80/00* | (2015.01) |

(52) U.S. Cl.
CPC ............... *F02F 1/26* (2013.01); *F01N 5/02* (2013.01); *F01P 9/00* (2013.01); *B33Y 80/00* (2014.12); *F01P 2060/04* (2013.01)

(58) Field of Classification Search
CPC ...... F02F 1/26; F02F 1/02; F01N 5/02; F01N 3/02; F01P 9/00; F01P 2060/04
See application file for complete search history.

(56) References Cited

U.S. PATENT DOCUMENTS

| | | | |
|---|---|---|---|
| 5,099,912 A | 3/1992 | Tajima et al. | |
| 6,408,803 B1 | 6/2002 | Atkins | |
| 7,730,872 B2 | 6/2010 | Leone et al. | |
| 8,087,256 B2* | 1/2012 | Babkin | C09K 5/045 62/434 |

(Continued)

FOREIGN PATENT DOCUMENTS

| | | |
|---|---|---|
| CN | 201635863 | 11/2010 |
| WO | 2009004439 | 1/2009 |

OTHER PUBLICATIONS

Miao et al., "Performance Analysis of Cooling System Based on Improved Supercritical CO2 Brayton Cycle for Scramjet", Applied Thermal Engineering, pp. 1-12, Elsevier, 2020.

(Continued)

*Primary Examiner* — Grant Moubry
*Assistant Examiner* — James G Moubry
(74) *Attorney, Agent, or Firm* — Grossman, Tucker, Perreault & Pfleger, PLLC

(57) ABSTRACT

Combustion engines, and more particularly, integrating a supercritical fluid passageway into a cylinder head and/or cylinder block of an engine, and preferably, a combustion engine. Both a combustion engine system and a method of cooling a cylinder head in an internal combustion engine, utilizing supercritical fluid, are disclosed.

15 Claims, 5 Drawing Sheets

(56) References Cited

U.S. PATENT DOCUMENTS

| | | | | |
|---|---|---|---|---|
| 2003/0102113 | A1* | 6/2003 | Memory | F28F 1/128 |
| | | | | 165/152 |
| 2005/0193974 | A1 | 9/2005 | Terada et al. | |
| 2006/0059945 | A1* | 3/2006 | Chordia | F25B 9/14 |
| | | | | 62/114 |
| 2008/0072984 | A1 | 3/2008 | Branch et al. | |
| 2018/0106213 | A1* | 4/2018 | Knollmayr | F01P 3/02 |
| 2020/0003112 | A1 | 1/2020 | Mulye | |

OTHER PUBLICATIONS

Ricci et al., "Thermal Analyses Supporting the Development of a Liquid Rocket Engine", International Journal of Heath and Technology, vol. 34, Special Issue 2, pp. S403-S412, IIETA, 2016.
International Search Report and Written Opinion from corresponding PCT Appln. No. PCT/US21/71988, dated Jan. 26, 2022.

* cited by examiner

Baseline:

Dimpled:

Finned:

Impinging Jets:

Flow Channels:

Lattice Structure:

TECHNIQUES FOR ENGINE COOLING USING SUPERCRITICAL FLUIDS AND A COMBUSTION ENGINE SYSTEM IMPLEMENTING THE SAME

CROSS-REFERENCE TO RELATED APPLICATIONS

The present application claims the benefit of the filing date of U.S. Provisional Application 63/198,487 filed on Oct. 22, 2020, the teachings of which are incorporated by reference.

FIELD

The present disclosure relates generally to combustion engines, and more particularly, integrating a supercritical fluid passageway into a cylinder head and/or cylinder block of an engine, and preferably, a combustion engine.

BACKGROUND

Modern internal combustion engines face many engineering challenges as designers continue to pursue greater efficiency and cleaner emissions from engines. One of the features of higher efficiency engines is a requirement for higher peak in-cylinder pressures for the combustion chamber. Future engines designs will therefore feature heavier and relatively more expensive mechanical designs to withstand these high pressures and enable the increased efficiency.

At the same time, there is an opportunity to improve engine efficiency by application of thermodynamic power cycles which can convert some of the waste engine heat into additional shaft work. Some of these systems have used engine coolant as a heat input, but the low thermodynamic availability of engine coolant significantly limits the energy recovery potential.

SUMMARY

A combustion engine system comprising a cylinder head comprising a combustion chamber and an exhaust outlet fluidly coupled to the combustion chamber to output combustion gases; and a supercritical fluid passageway extending at least partially through the cylinder head to communicate a volume of a supercritical fluid into the cylinder head and draw heat from the combustion gases.

A method for cooling a cylinder head in an internal combustion engine comprising providing a cylinder head comprising a combustion chamber and an exhaust outlet fluidly coupled to the combustion chamber to output combustion gases which exhaust outlet outputs exhaust gases in first direction, including a supercritical fluid passageway extending at least partially through the cylinder head to communicate a volume of a supercritical fluid into the cylinder head and draw heat from the combustion gases; and providing a supercritical fluid and flowing said supercritical fluid in said supercritical passageway in a second direction counter to said first direction.

BRIEF DESCRIPTION OF THE DRAWINGS

The drawings included herewith are for illustrating various examples of articles, methods, and apparatuses of the teaching of the present specification and are not intended to limit the scope of what is taught in any way.

DETAILED DESCRIPTION

In general, the present disclosure is directed to a combustion engine that utilizes, for example, a supercritical fluid. A supercritical fluid is understood as any substance at a temperature and pressure above its critical point wherein distinct liquid and gas phases do not exist, but below the pressure required to compress it into a solid.

Preferably, the supercritical fluid is supercritical carbon dioxide (sCO2), which is contemplated to maintain a target temperature within the cylinder head and/or cylinder block. Aspects of the present disclosure have identified that the use of supercritical fluid channels/passageways within a cylinder head and/or cylinder block can allow for cylinder pressures in excess of 300 bar and achieve system brake thermal efficiency in excess of 50-55% (including all ranges and values therebetween), and more preferably, in excess of 60%. Note, the supercritical fluid channels/passageways may also be referred to herein as supercritical coolant passageways. Preferably, the supercritical fluid passageways implemented with a cylinder head and/or cylinder block are capable of withstanding pressures of at least 200 bar, or more preferably in the range of 200 bar to 400 bar.

In one specific non-limiting example embodiment a combustion engine system is disclosed. The combustion engine system preferably includes a cylinder head formed with at least one supercritical fluid passageway that can accommodate a volume of, for example, sCO2.

The cylinder head defines a portion of a combustion chamber and an exhaust outlet in fluid communication with the combustion chamber to output combustion gases. The at least one supercritical fluid passageway preferably extends at least partially through the cylinder head to draw heat from the combustion chamber and/or exhaust gases. Preferably, the at least one supercritical fluid passageway includes an inlet adjacent the exhaust outlet such that the volume of supercritical fluid, e.g., a volume of sCO2, enters the cylinder head at a hottest region and gets communicated through the cylinder head in a direction substantially opposite of that of the exhaust gases output via the exhaust outlet.

Figure 1:
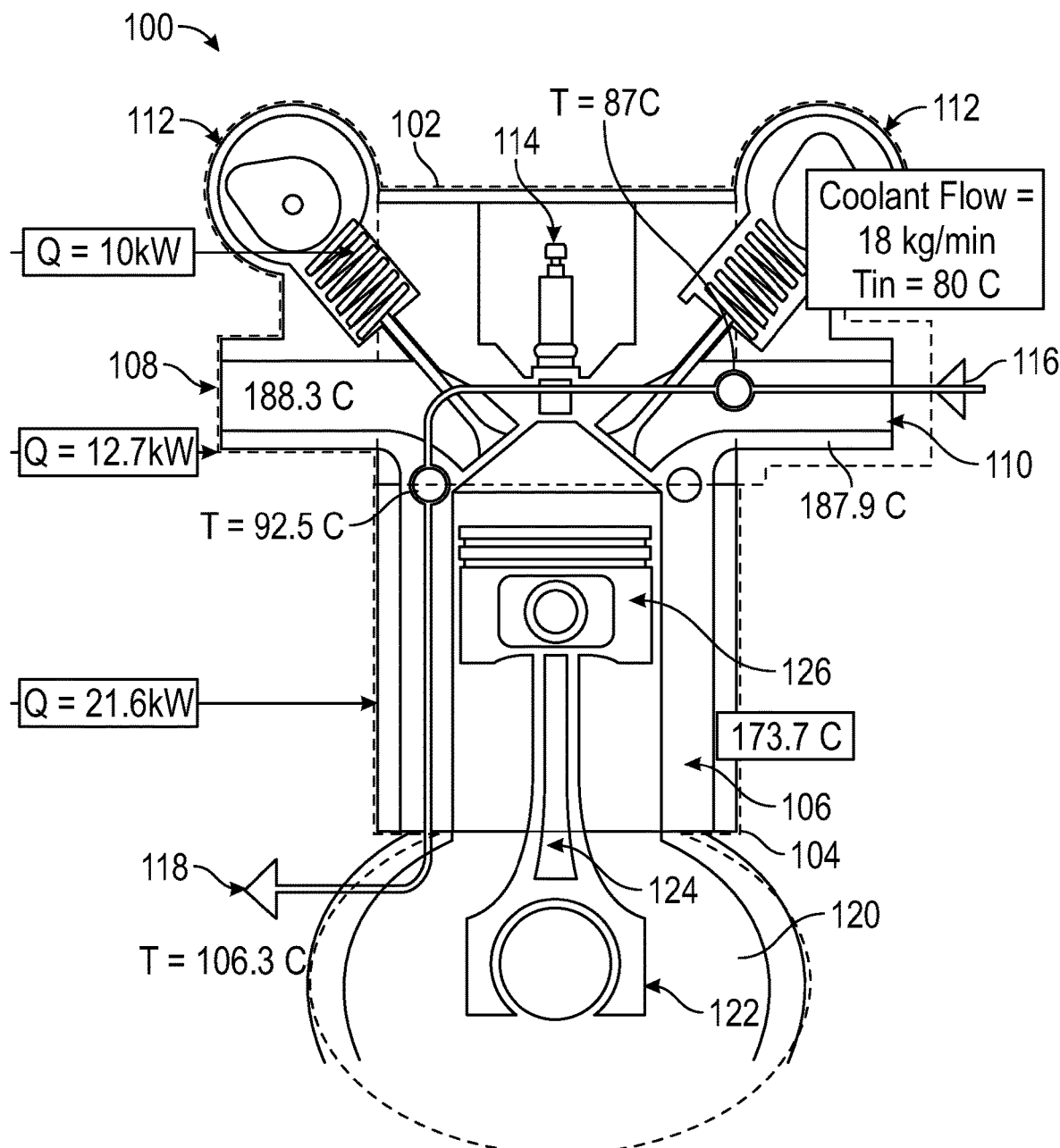
FIG. 1 shows an example engine in accordance with embodiments of the present disclosure.

FIG. 1 shows an example engine 100 consistent with aspects of the present disclosure. The example engine 100 includes a cylinder head 102 mounted to a cylinder block 104. The cylinder head 102 may also be referred to herein as a head, and the cylinder block 104 may also be referred to herein as a block.

Preferably, the example engine 100 is configured as a combustion engine.

The cylinder head 102 can comprise, for example, cast iron although other metals are within the scope of this disclosure. The cylinder block can comprise, for example cast iron although other metals are within the scope of this disclosure.

The cylinder head 102 preferably defines at least an upper portion of the combustion chamber 106.

The cylinder head 102 also preferably includes an air intake 108 disposed opposite an exhaust outlet 110. The air intake 108 fluidly couples to the combustion chamber 106 by way of one or more channels. Likewise, the exhaust outlet 110 fluidly couples to the combustion chamber by way of one or more channels. The cylinder head 102 can further include cam shafts 112 with associated valve springs to regulate air and exhaust flow via the air intake 108 and exhaust outlet 110.

The cylinder head 102 can preferably include at least one igniter 114 that extends at least partially within the combustion chamber 106. The at least one igniter 114 is preferably implemented as a spark plug. However, in the broader scope of the disclosure herein, the combustion chamber may also include a diesel combustion chamber where there is no spark plug.

The cylinder head 102 can include at least one supercritical fluid passageway 116 extending at least partially therethrough. The supercritical fluid passageway 116 is preferably configured to communicate sCO2 at least partially through the cylinder head 102, and more preferably, at least partially through the cylinder head 102 and the cylinder block 104.

The at least one supercritical fluid passageway 116 can be configured to withstand pressures associated with supercritical CO2 (e.g., at least 200 bar or preferably 200 bar to 400 bar).

As discussed in further detail below, the at least one supercritical fluid passageway 116 is configured to include an inlet (also referred to herein as a supercritical fluid inlet) adjacent the exhaust outlet 110 such that a volume of supercritical fluid enters the cylinder head 102 at the hottest region of the same during operation, as is discussed in further detail below. As shown in FIG. 1, the at least one supercritical fluid passageway 116 extends at least partially through the cylinder block 104 to one or more outlets 118.

However, the at least one supercritical fluid passageway 116 can include various different configurations including, for example, one or more outlets disposed adjacent the air intake 108, one or more outlets disposed along the cylinder block 104, or both, depending on a desired configuration.

The cylinder block 104 can define a lower portion of the combustion chamber 106. The cylinder block 104 can include a crank case 120. The crank case can include a crank shaft 122 and a connecting rod 124. The crank shaft 122 and connecting rod 124 preferably couple to piston 126. The piston 126 is disposed within the combustion chamber 106 and is configured to introduce a predetermined amount of pressure within the combustion chamber 106 during operation. In one non-limiting example configuration, the piston 126 is configured to generate cylinder pressures of at least 300 bar.

As shown in the example of FIG. 1, the at least one supercritical fluid passageway 116 preferably extends substantially parallel with the combustion chamber 106 along a sidewall of the cylinder block 104 that defines the combustion chamber 106.

In operation, a volume of supercritical fluid, e.g., sCO2, preferably enters the cylinder head 102 at the hottest point (e.g., at or proximate position of the exhaust outlet 110).

The volume of supercritical fluid then gets displaced/flows at least partially through the cylinder head 102 through one or more regions of the engine 100 and ultimately to one or more outlets. For example, one or more outlets may be disposed proximate to the air intake 108, or disposed proximate the cylinder block 104, or both.

In any such cases, the at least one supercritical fluid passageway 116 can be disposed along various regions that extend from the exhaust outlet 110 to the one or more associated outlets.

As discussed above, the volume of supercritical fluid enters the cylinder head 102 via the at least one supercritical fluid passageway 116 at a location proximate the hottest region of the engine 100, which is to say the region defining the exhaust outlet port 110. This hottest region may also be referred to as a first region. This disclosure has recognized that supercritical fluid such as sCO2 does not boil at temperatures that characterize exhaust gas, e.g., between 200 and 1000 degrees Celsius, and thus may advantageously enter the cylinder head 102 at a region having the greatest heat, which is to say the exhaust outlet 110.

The at least one supercritical fluid passageway 116 then extends into a second region of the cylinder head 102 that defines the combustion chamber 106. In scenarios where the at least one supercritical fluid passageway 116 extends at least partially through the cylinder block 104, the at least one supercritical fluid passageway 116 then extends through a third region.

The at least one supercritical fluid passageway 116 therefore preferably allows for a volume of supercritical fluid to flow in a direction substantially opposite to that of the exhaust gases, e.g., counter to the direction of exhaust gases exiting via the exhaust outlet 110. Preferably, the rate of flow for the volume of supercritical fluid entering the supercritical fluid passageway 116 is about 48 kg/min, although other flow rates are within the scope of this disclosure, such as flow rates in the range of 10 kg/min to 100 kg/min.

By way of a preliminary analysis to demonstrate plausibility, the delta T between the cylinder head 102 and volume of supercritical fluid would be greatest at the point of entry. For example, and as shown in FIG. 1, the delta T between the temperature of the first region defining the exhaust outlet 110 may be about 80 degrees Celsius proximate the entry point of the first region and may be about 87 degrees Celsius at the boundary between the first and second regions.

As further shown in FIG. 1, the delta T between the second and third regions, and more specifically the interface between the cylinder head 102 and the cylinder block 104 may be about 92.5 degrees Celsius. At the one or more outlets of the at least one supercritical fluid passageway 116, the delta T may be about 106.3 degrees Celsius.

Thus, the first region is preferably maintained at a first predetermined operating temperature that may be about 187.9 degrees Celsius±10 degrees based on the volume of supercritical fluid flowing therethrough. The second region may be maintained at a second predetermined temperature of about 188.3 degrees Celsius±10 degrees based on the volume of supercritical fluid flowing therethrough. And the third region may be maintained at a third predetermined temperature of about 106.3 degrees Celsius±10 degrees based on the volume of supercritical fluid flowing therethrough.

Alternatively, or in addition, the cylinder block 104 may be cooled via lubricating oil, as is discussed in further detail below. In this example, a volume of supercritical fluid can flow at least partially through the cylinder head 102 without necessarily flowing through the cylinder block 104. Instead, the cylinder block 104 can include one or more lubricant passageways (or oil passageways) that allow for a volume of oil to flow therethrough. The lubricant passageways then preferably fluidly couple with an external heat exchanger, e.g., a radiator, to form a cooling circuit. More preferably, the external heat exchanger utilizes supercritical fluid such as sCO2 to draw heat from the oil passing therethrough.

Existing engine cooling approaches, such as those that feature water/glycol cooled cylinder heads, include the cooling fluid entering the cylinder head from the cylinder block at one end. The cooling fluid then exits via the cylinder head via a radiator return line.

The amount of heat transfer in the sCO2 system herein is contemplated to be similar to an engine with water/glycol coolant. The sCO2 actually reduces the heat transfer coefficients and increases the resulting metal temperature as reported in FIG. 1. The heat transfer enhancement schemes of FIG. 3 (discussed below) may then be utilized to minimize the adverse impact of sCO2 on metal temperatures. Accordingly, sCO2 is not used to improve heat transfer but to recover energy for a waste heat recovery cycle-that advantage outweighs the heat transfer performance disadvantage.

Moreover, an engine consistent with the present disclosure can preferably have supercritical fluid entering at a plurality of inlets along the length of the cylinder head 102 and output the supercritical fluid at a plurality of supercritical fluid outlets on an opposite side of the cylinder head 102 and/or cylinder block 104.

Figure 2:
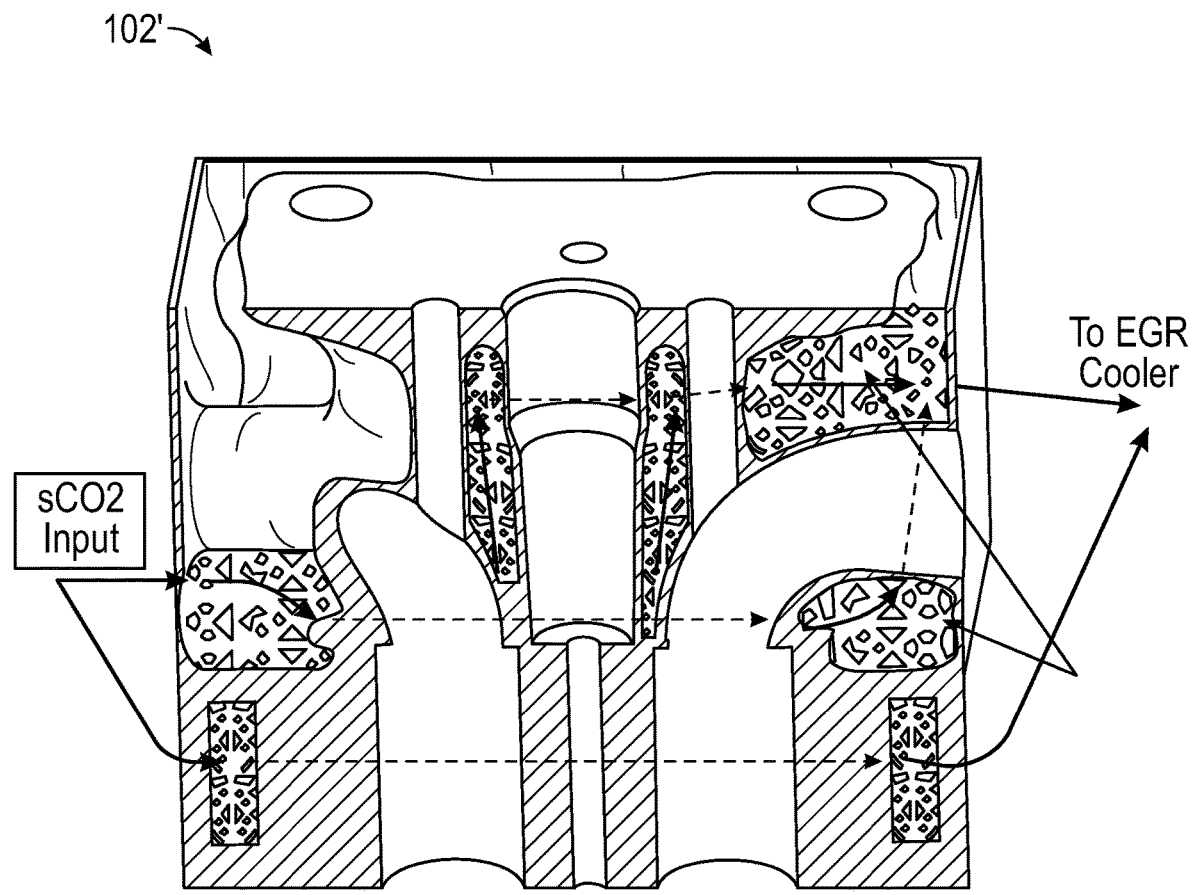
FIG. 2 shows a cross-sectional view of an example cylinder head for use in the example engine of FIG. 1, in accordance with embodiments of the present disclosure.
Figure 3A:
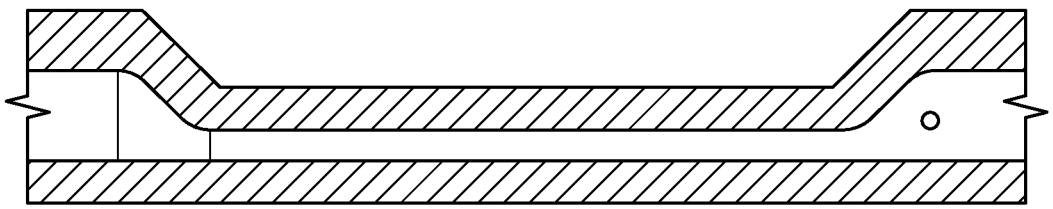
FIGS. 3A-3F show example supercritical fluid passageways for use in the example engine of FIG. 1, in accordance with embodiments of the present disclosure.
Figure 3B:
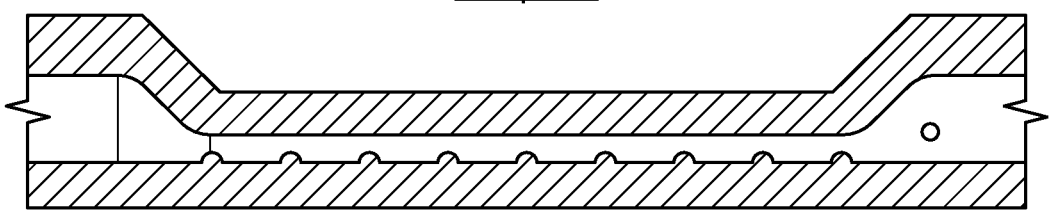
Figure 3C:
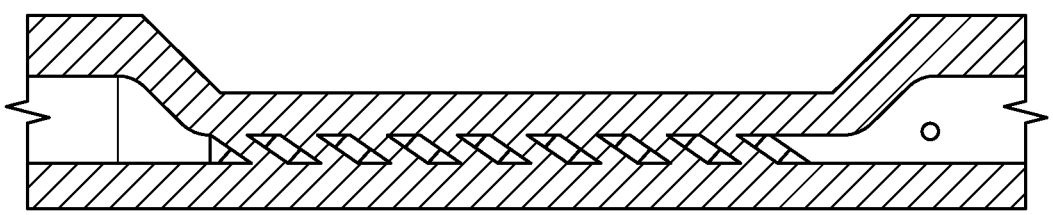
Figure 3D:
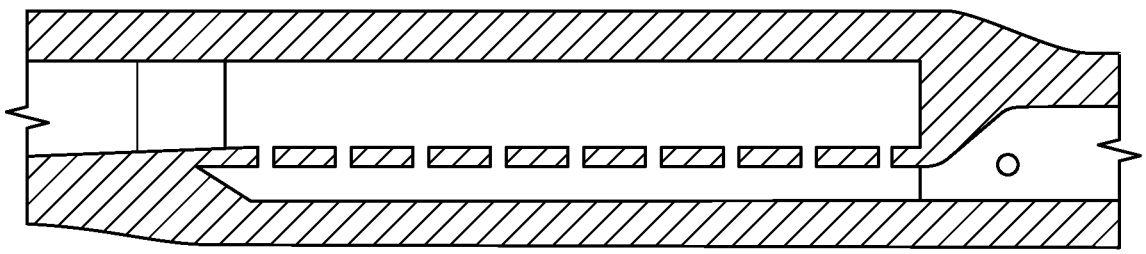
Figure 3E:
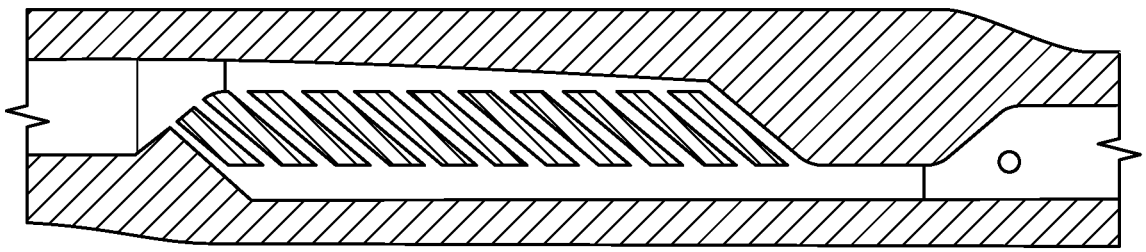
Figure 3F:
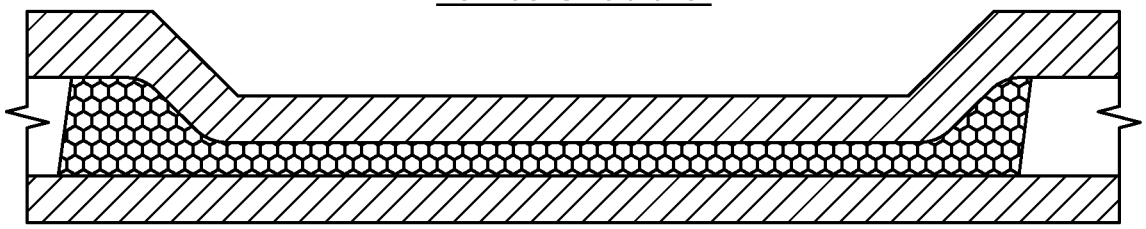

FIG. 2 shows a cross-sectional view of an example cylinder head 102' suitable for use in the engine 100 of FIG. 1. In particular, the cylinder head 102' is shown implemented as an A-M cylinder head designed for ultra-high cylinder pressure, e.g., between 250 and 350 bar.

Preferably, the cylinder head 102' is formed via an additive manufacturing process to provide at least a portion of the at least one supercritical fluid passageway 116 (FIG. 1) with porous channels, such as shown in FIG. 2. Preferably, the porosity of the supercritical fluid passageway 116 in this preferred example is at least 20%, which is to say the ratio of the overall volume of void space, e.g., empty space, in the cylinder head 102' relative to the total volume of the cylinder head 102 is 1:5. More preferably, the porosity of the supercritical fluid passageway 116 is at least 40%, 50%, or between 70-90% including all ranges therebetween.

The porous channels shown in FIG. 2 are particularly well suited for communicating supercritical fluid such as sCO2 given the relatively low viscosity of sCO2.

The porous structures also provide a relatively large heat transfer area from the metal forming the cylinder head 102' to the supercritical fluid, and also provides additional structural strength to both withstand the pressures of the volume of the supercritical fluid, e.g., ~250 bar, and the target peak combustion pressures of the associated engine cylinder, e.g., ~300 bar. Because the supercritical fluid can be at a nominal 250 bar (or higher depending on the particular scenario), the supercritical fluid itself can aid in balancing the combustion gas pressure in the combustion chamber.

Accordingly, the structure that contains the combustion pressure, e.g., the cylinder head 102 and/or the cylinder block 104, can be formed with relatively less material and thus be reduced in weight. In some cases, material may then be disposed/redistributed to other locations along the cylinder head/cylinder block to assist in containing the supercritical fluid pressure. However, even in these cases, this disclosure has identified that an engine consistent with the present disclosure would still have an overall weight that is less than other engine approaches that seek to have an equivalent peak combustion pressure but that do not utilize supercritical fluid cooling as disclosed herein.

Thus, an engine consistent with the present disclosure can achieve greater fuel efficiency without necessarily increasing the thickness of the various internal structures defining the combustion chamber within the cylinder head to withstand the associated combustion pressures. Stated differently, an engine consistent with the present disclosure benefits from increased structural integrity based at least in part on the load-bearing mechanical characteristics of the supercritical fluid flowing through the at least one supercritical fluid passageway. This both reduces the overall weight of the engine and allows for combustion pressures during operation of an engine that would otherwise structurally comprise the cylinder head/cylinder block without the benefit of the supercritical fluid flowing through.

FIGS. 3A-3F show additional example configurations for the at least one supercritical fluid passageway 116 of FIG. 1. Note, a supercritical fluid passageway configured consistent with the present disclosure can utilize one or more of the example structures shown in FIGS. 3A-3F, and preferably, one or more of those example structures in combination with the porous channels as discussed above with regard to FIG. 2.

The example configurations of supercritical fluid passageways shown in FIGS. 3A-3F advantageously allow for the relatively small feature areas of the cylinder head (e.g., between valve locations and between the valves and the fuel injector) to provide relatively high heat transfer performance within a small space.

Supercritical fluid passageways with different geometries and profiles are within the scope of this disclosure. Preferably, the supercritical fluid passageways are formed via an additive manufactured insert that would be placed into the casting mold before casting the rest of the cylinder head, or also could be additive manufactured forms for the casting process. That is, the additive manufactured insert would be made of metal and would be placed into the casting form, then the remaining head material cast around the insert which would become an integral part of the cylinder head. An additive manufactured form would be a portion of the casting form (which is typically made of sand) and which would be the inverse geometry of the metal cylinder head which is produced in the casting process.

Note, inner surfaces of the cylinder block 104 and head 102, where the supercritical fluid (or oil) is located, may contain features to enhance heat transfer, e.g., engineered surface roughness, fins, or other fluid turbulence features.

Figure 4:
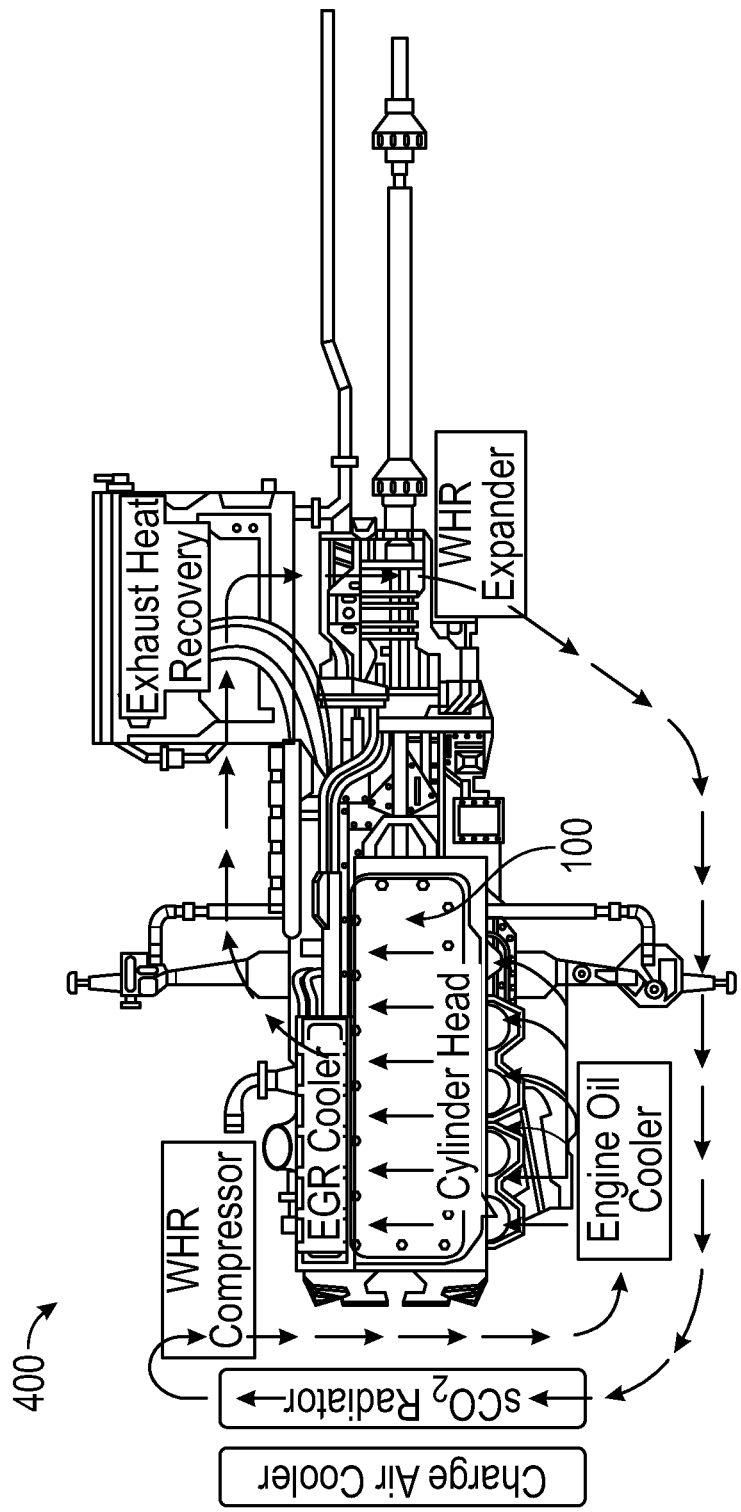
FIG. 4 shows an example engine system implementing the example engine of FIG. 1, in accordance with an embodiment of the present disclosure.

FIG. 4 shows an example engine system 400 implementing the engine 100 of FIG. 1. The example engine system 400 illustrates an example configuration that integrates SCO2 cooling within a vehicle application.

FIG. 4 shows a heat recovery cycle that includes fluid transfer lines, additional heat exchanger(s) to remove thermal energy from other powertrain systems (cooling the engine lubricating oil, cooling exhaust gas recirculation flows, cooling the engine exhaust, and/or any other heat sources present), an expansion machine, a compression machine, and a heat exchanger for rejecting remaining thermal energy to the air in place of a conventional radiator.

In this example configuration, at least one supercritical radiator/heat exchanger at the front of the vehicle, and various other heat generating sources would form a portion of the supercritical fluid loop. The at least one supercritical radiator/heat exchanger is preferably implemented as a sCO2 heat exchanger.

The engine system 400 generates power from the supercritical fluid in the expander can feed/output into the engine crankshaft and/or into a generator that was integrated into a hybrid electric power system on the vehicle.

The engine system 400 may also optionally use supercritical fluid cooling for the charge air (e.g., between the turbocharger compressor and the inlet manifold).

Aspects of the present disclosure include the use of supercritical cooling within a cylinder head and/or cylinder block. Existing engine approaches have been limited to system brake thermal efficiency of 50% or less.

An engine consistent with aspects of the present disclosure can reach system brake thermal efficiency of 60% or greater for engine types such as heavy duty truck engines.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that an apparatus may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed:

1. A combustion engine system comprising:
   a cylinder head comprising:
      a combustion chamber and an exhaust outlet fluidly coupled to the combustion chamber to output combustion gases; and
      a supercritical fluid passageway extending at least partially through the cylinder head to communicate a volume of a supercritical fluid into the cylinder head and draw heat from the combustion gases, further comprising a cylinder block, the cylinder head mounted to the cylinder block, and wherein the cylinder block defines a portion of the combustion chamber wherein the cylinder block includes a lubricant passageway extending at least partially therethrough to communicate oil through the cylinder block further comprising a supercritical fluid heat exchanger to draw heat from an oil output by the lubricant passageway.

2. The combustion engine system of claim 1, wherein the supercritical fluid passageway includes an inlet disposed adjacent the exhaust outlet.

3. The combustion engine system of claim 1, wherein the supercritical fluid passageway includes a plurality of inlets disposed adjacent the exhaust outlet.

4. The combustion engine system of claim 1, wherein the supercritical fluid passageway includes a plurality of channels formed through an additive manufacturing process.

5. The combustion engine system of claim 1, wherein the supercritical fluid passageway extends at least partially through the cylinder block.

6. The combustion engine system of claim 1, wherein the volume of supercritical fluid is supercritical carbon dioxide (sCO2) and wherein the supercritical fluid passageway is configured to withstand pressures of at least 80 bar.

7. The combustion engine system of claim 1, wherein the combustion engine system is implemented within a vehicle and configured to operate with a system brake thermal efficiency of at least 55%.

8. A method for cooling a cylinder head in an internal combustion engine comprising:
   providing a cylinder head comprising a combustion chamber and an exhaust outlet fluidly coupled to the combustion chamber to output combustion gases which exhaust outlet outputs exhaust gases in first direction, including a supercritical fluid passageway extending at least partially through the cylinder head to communicate a volume of a supercritical fluid into the cylinder head and draw heat from the combustion gases;
   providing a cylinder block, the cylinder head mounted to the cylinder block, and wherein the cylinder block defines a portion of the combustion chamber wherein the cylinder block includes a lubricant passageway extending at least partially therethrough to communicate oil through the cylinder block and a supercritical heat exchanger to draw heat from the oil from an oil output by the lubricant passageway; and
   providing a supercritical fluid and flowing said supercritical fluid in said supercritical passageway in a second direction counter to said first direction.

9. The method of claim 8 wherein said flow of said supercritical flow is in the range of 10 kg/min to 100 kg/min.

10. The method of claim 8 wherein said supercritical fluid passageway includes an inlet disposed adjacent the exhaust outlet.

11. The method of claim 8 wherein the supercritical fluid passageway includes a plurality of channels.

12. The method of claim 8 wherein the supercritical fluid passageway extends at least partially through the cylinder block.

13. The method of claim 8, wherein the volume of supercritical fluid is supercritical carbon dioxide (sCO2) and wherein the supercritical fluid passageway is configured to withstand pressures of at least 80 bar.

14. The method of claim 8, wherein said method is implemented within a vehicle and configured to operate with a system brake thermal efficiency of at least 55%.

15. A combustion engine system comprising:
   a cylinder head comprising:
      a combustion chamber and an exhaust outlet fluidly coupled to the combustion chamber to output combustion gases;
      a supercritical fluid passageway extending at least partially through the cylinder head to communicate a volume of a supercritical fluid into the cylinder head and draw heat from the combustion gases wherein said fluid passageway vents to an outlet; and
   wherein the volume of supercritical fluid is supercritical carbon dioxide (sCO2) and wherein the supercritical fluid passageway is configured to withstand pressures of at least 200 bar.

* * * * *